United States Patent

Spencer et al.

(10) Patent No.: US 6,457,105 B1
(45) Date of Patent: Sep. 24, 2002

(54) SYSTEM AND METHOD FOR MANAGING DATA IN AN ASYNCHRONOUS I/O CACHE MEMORY

(75) Inventors: Thomas V Spencer, Ft Collins, CO (US); Robert J Horning, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/232,505

(22) Filed: Jan. 15, 1999

(51) Int. Cl.[7] .............................................. G06F 12/00
(52) U.S. Cl. ....................................... 711/136; 711/160
(58) Field of Search ................................ 711/118, 135, 711/136, 160, 204, 213; 712/237, 238, 239, 240

(56) References Cited

U.S. PATENT DOCUMENTS

| | | | |
|---|---|---|---|
| 4,774,654 A | * 9/1988 | Pomerene et al. | 711/122 |
| 4,949,251 A | * 8/1990 | Griffin et al. | 714/20 |
| 5,446,863 A | 8/1995 | Stevens et al. | |
| 5,608,878 A | 3/1997 | Arimilli et al. | |
| 5,673,414 A | 9/1997 | Amini et al. | |
| 5,717,884 A | 2/1998 | Gzym et al. | |
| 5,724,549 A | 3/1998 | Selgas et al. | |
| 5,751,993 A | 5/1998 | Ofek et al. | |
| 5,787,471 A | 7/1998 | Inoue et al. | |
| 5,787,473 A | 7/1998 | Vishlitzky et al. | |
| 5,809,022 A | 9/1998 | Byers et al. | |
| 6,065,006 A | * 5/2000 | deCarmo et al. | 707/7 |

* cited by examiner

*Primary Examiner*—Matthew Kim
*Assistant Examiner*—Matthew D. Anderson (57) ABSTRACT

The present invention is generally directed to a system and method for providing improved memory management in an asynchronous I/O cache memory. The method includes the steps of identifying a request for data from the system memory by a requesting device that is in communication with the system memory via an I/O bus. Then the method controls the communication of data from the system memory into the cache memory. The method further includes the step of communicating the data from the cache memory to the requesting device, and immediately after communicating the data to the requesting device, the method discards the data from the cache memory. In accordance with the preferred embodiment, the method flushes data from the I/O cache line at a time. Therefore, when a given cache line of data is flushed from the cache after the last data byte of the cache line is communicated out to the requesting device.

17 Claims, 5 Drawing Sheets

SYSTEM AND METHOD FOR MANAGING DATA IN AN ASYNCHRONOUS I/O CACHE MEMORY

BACKGROUND OF THE INVENTION

1. Field of the Invention

The present invention generally relates to memory management systems, and more particularly to a system for managing data in an asynchronous input/output (I/O) cache memory.

2. Discussion of the Related Art

In computer system design, a principal objective is to continually design faster and more efficient computer systems. In this regard, most conventional high-performance computer systems include cache memories. As is known, a cache memory is a high-speed memory that is positioned between a microprocessor and main memory in a computer system in order to improve system performance. Typically, cache memories (or caches) store copies of portions of main memory data that are actively being used by the central processing unit (CPU) while a program is running. Since the access time of a cache can be faster than that of main memory, the overall access time can be reduced.

Cache memory is used in data storage systems so that under typical conditions, a relatively large and slow main memory can be accessed at a relatively high rate. The cache memory is a relatively small high-speed memory that can store, at any given time, a portion of the data stored in the main memory. The cache memory also includes a cache directory or index of the data elements stored therein. The cache directory is referenced to provide an indication of whether or not each data element is located in the cache memory at any given time, and if so, the present location of the data element in the cache memory.

A data storage system is typically responsive to data access requests from a host computer. The data access requests, for example, include read and write requests. When a data storage system having a cache memory receives a request for access to data, the cache directory is inspected to determine whether the data element to be accessed resides in the cache memory. If so, the data storage system accesses the data in the cache memory. If not, the data storage system accesses the data in the main memory, and if the accessed data is likely to be accessed again in the near future, the accessed data is copied into the cache memory.

In some data storage systems, data elements to be accessed are always copied into the cache memory if they are absent from the cache memory. Some data storage systems are also responsive to explicit "prefetch" commands from the host computer to cause specified data to be copied into the cache, even though the specified data is not immediately accessed by the host computer.

Because the cache memory has a capacity that is usually much smaller than the main memory, it is often necessary for data elements in the cache memory to be replaced or removed from the cache memory in order to provide space in the cache memory for new receiving data elements to be copied into the cache memory. In general, for the cache memory to be useful, the data elements replaced or removed from the cache memory must be less likely to be accessed in the near future than the data elements that are staged into the cache memory. This process is conventionally known as cache management.

A wide variety of methods and strategies are known for managing data within a cache memory to achieve optimum system performance. These methods often vary from system to system, and from application to application. Management methods may vary depending upon whether the cache memory is an electronic (e.g., integrated circuit) memory that is caching data on a disc drive (main memory), or whether the cache memory is a high speed electronic memory that is caching data for a slower speed electronic memory (main memory). Management methods may further vary depending upon the size of the cache memory.

Notwithstanding the various cache memory management methods, generally, when space is available within the cache memory for new data, the new data is simply copied into the available space, and logged in the directory/index of the cache. When, however, no additional space is available for new data then existing data must be discarded to make room for the new data. Also, the directory/index must be updated accordingly. As previously mentioned, there are a variety of methods that are known and implemented for determining which data within the cache to discard, each of which seeks to discard data that will not likely be used again (at least in the near term).

Notwithstanding the various known methods for cache memory management, further improvements are desired.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for providing improved memory management in an asynchronous I/O cache memory. In accordance with one aspect of the invention, a method is provided and includes the steps of identifying a request for data from the system memory by a requesting device that is in communication with the system memory via an I/O bus. Then the method controls the communication of data from the system memory into the cache memory. The method further includes the step of communicating the data from the cache memory to the requesting device, and immediately after communicating the data to the requesting device, the method discards the data from the cache memory.

In accordance with the preferred embodiment, the method flushes data from the I/O cache, one line at a time. In one implementation, a given cache line of data is flushed from the cache after the last data byte of the cache line is communicated out to the requesting device. It will be appreciated, however, that more sophisticated implementations may be employed. For example, it may be determined by a cache memory controller that the requesting device has requested a block of contiguous data, which block ends at some intermediate position within the cache line. However, consistent with the inventive concepts, upon determination that the last data byte from the block has been communicated, then the invention may immediately flush the cache line containing that last data byte. If the data block spanned more than one cache line, previous cache lines would be flushed upon communication of the last data byte from each line to the requesting device.

As a particular example, one embodiment of the present invention may identify a request for data originating from an ATM card. Recognizing that simple ATM communications occur in precise 48 byte payloads, an embodiment of the present invention can assume that precisely 48 contiguous bytes will be communicated to the requesting device. Accordingly, upon communication of the last of the 48 data bytes, this embodiment of the invention may flush the line of cache data containing the last of the 48 data bytes. If the first byte of the 48 data bytes was located in a different cache line, then that different cache line may, as mentioned above, be flushed upon communication of the last data byte from that cache line.

It will be appreciated that the present invention realizes significant performance enhancements, by recognizing that I/O traffic is usually not recurrent within a small window of time (unlike CPU instructions and certain other types of data). More particularly, significant performance gains are obtained by the invention for relatively large, contiguous data blocks, or even small data blocks, when the precise size (or ending byte) is known. For large data blocks that may consume multiple cache lines, each cache line is flushed upon communicating the last byte of the cache line out to the requesting device. Likewise, when the last byte of the requested data is known, then the cache line containing that last byte may be flushed upon communicating that byte. This makes these cache lines immediately available for receiving new data, without incurring the latency that is otherwise associated with clearing space within the cache.

In accordance with another aspect of the present invention, a system is provided for managing data in a cache memory. The system includes memory space comprising a plurality of data lines within the cache memory. In addition, the system comprises a memory manager configured to manage the data within the memory space. In this regard, the memory manager is made up of several functional units. One functional unit may be configured to identify a memory read from a requesting device communicating across an I/O bus. Another functional unit is configured to control the communication of data from the system memory into at least one line of the memory space within the cache. Another functional unit is configured to control the communication of data from the cache memory space out of the cache memory. Finally, another functional unit is configured to discard each line of cache data as the last data byte from that line is communicated to the requesting device.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
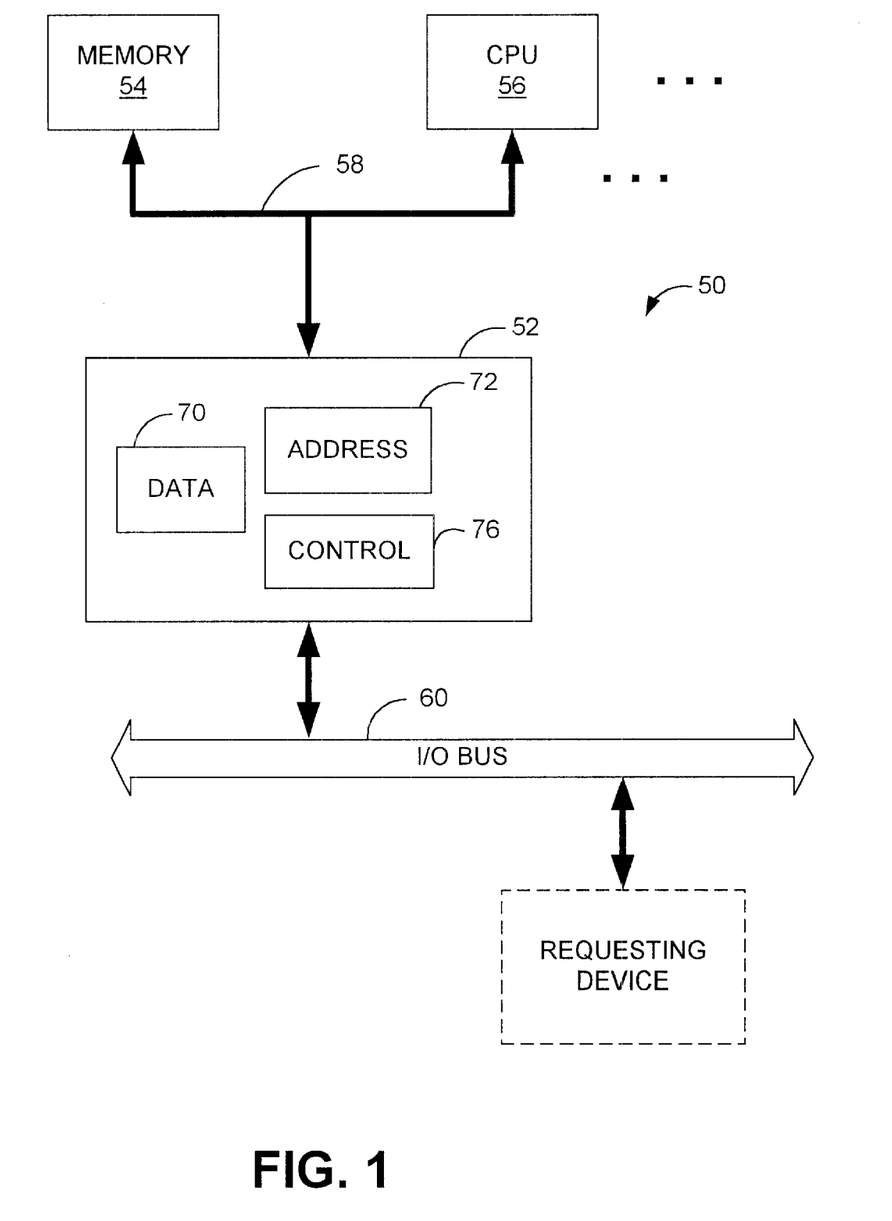
FIG. 1 is a block diagram illustrating the location of an I/O cache between a system bus and an I/O bus.

Reference is now made to FIG. 1, which is a block diagram that illustrates a top-level view of a system 50 constructed in accordance with the concepts and teachings of the present invention. More particularly, the invention comprises an apparatus 52 that is particularly configured to be interposed between a system bus 58 and an I/O bus 60. As will be appreciated by persons skilled in the art, the system bus 58 is a grouping of conductors that provides a means for intercommunicating among a number of devices in a computing system, such as a memory 54, a CPU 56, as well as other devices. In similar fashion, the I/O bus 60 is a grouping of conductors that provides a means for the devices 54, 56 on the system bus 58 to intercommunicate with other, remote devices.

As will be further described in connection with FIG. 2, in a computing environment such as a personal computer, a system is frequently provided having a motherboard that contains certain system components, such as a memory and CPU, on a motherboard. To accommodate a variety of differing "expansion" cards, a plurality of expansion slots are provided on the motherboard as well. Such expansion cards may include disk drive controllers, modems and other communication cards, etc. While some cards or devices such as these may intercommunicate with the CPU and memory via the system bus 58, others often communicate via an I/O bus, such as a PCI bus.

As is known, the devices that intercommunicate via the system bus 108 generally do so in a synchronous fashion, insofar as these devices operate from a common system clock. The present invention provides a device 52 that is interposed between the system bus and the I/O bus. In the broadest sense, the present invention can be viewed as a device having a cache data storage area 70 as well as an address (or tag) storage area 72 and a controller 76. As will be appreciated from the discussion that follows, the present invention achieves its advantages by maximizing the amount of available space within the cache memory. It achieves this goal by immediately flushing data from the cache that is deemed unlikely to be used in the near future. In this respect, the preferred embodiment of the invention assumes that I/O data is unlikely to be used repeatedly. Therefore, once the data is communicated to the requesting device from the cache memory, it is flushed from the cache memory.

Figure 2:
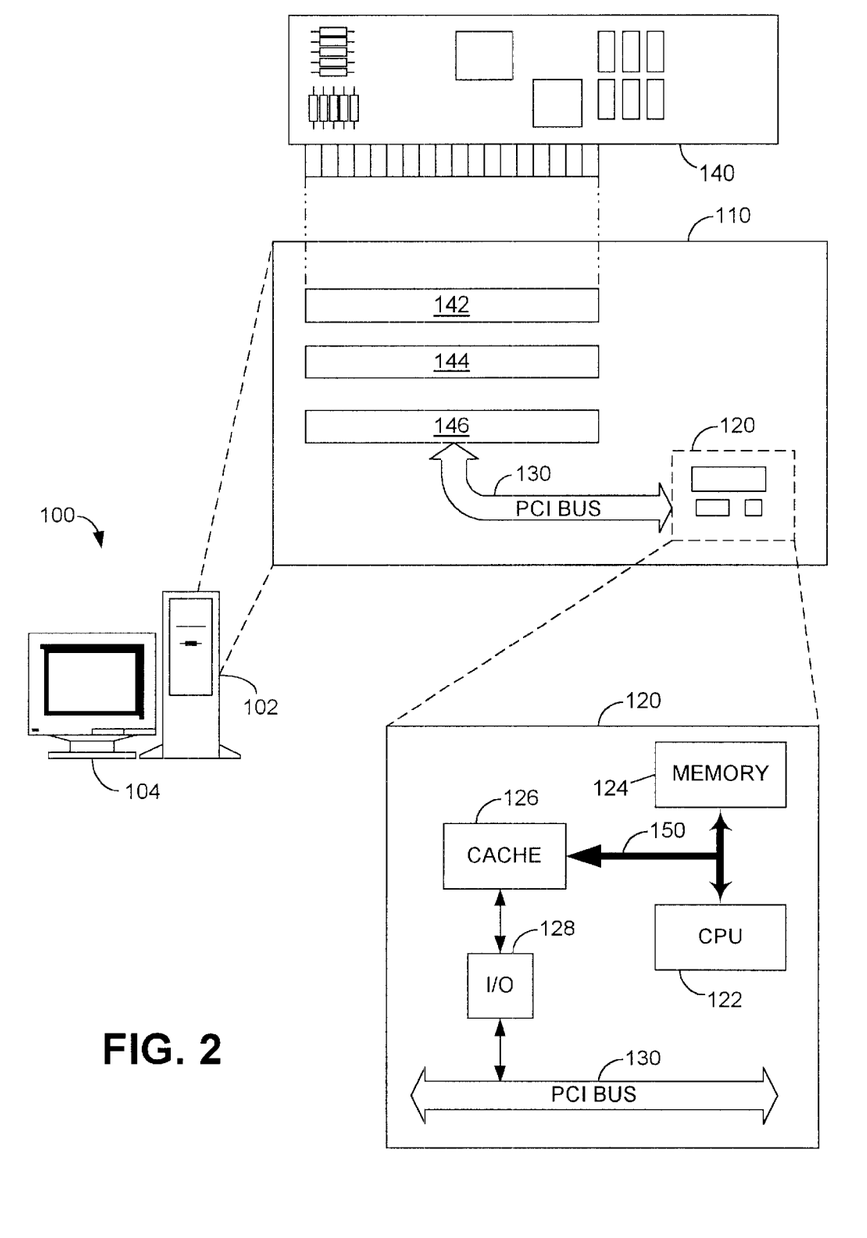
FIG. 2 is a block diagram of high-performance computer system having an expansion card in communication with a cache memory across a PCI (I/O) bus.

Reference is made to FIG. 2, which shows a computer system 100 defining an environment that typifies the environment of the preferred embodiment of the present invention. In this regard, the computer system 100 may be any of a variety of high-performance computing systems, such a high-end desktop computing system having a computer 102 and monitor 104. Although the computer 102 may come in a variety of forms, a typical computer 102 will include a motherboard 110. As is known, the motherboard 110 typically includes various on-board integrated circuit components 120. These on-board integrated circuit components 120 may include devices like a CPU 122 (e.g., a microprocessor), a memory 124, and a variety of other integrated circuit devices known and included in computer architectures.

Another integrated circuit device, whether located on the motherboard or located on a plug-in card, is a cache memory 126. The cache memory 126 is disposed in communication with a PCI bus 130 via I/O circuitry 128. Consistent with the concepts and teachings of the present invention, a variety of other circuit components may be included within the computer system 100 as well. Indeed, a variety of other support circuits and additional functional circuitry are typically included in most high-performance computing systems. The addition and implementation of other such circuit components will be readily understood by persons of ordinary skill in the art, and need not be described herein. Instead, the computing system 100 of FIG. 2 has been illustrated with only a select few components in order to better illustrate the concepts and teachings of the present invention.

As is further known, in addition to various on-board circuit components, computing systems usually include expansion capability. In this regard, most computing systems 100 include a plurality of expansion slots 142, 144, 146, which allow integrated circuit cards to be plugged into the motherboard 110 of the computing system 100. More particularly, expansion cards 140 typically provide some specialized in functionality that may not be desired for all uses of a computing system, but rather for specialized uses of certain user groups. For example, a modem card (not shown) allows a computing system 100 to communicate voice, data, and other information to remote computing systems or users over a telecommunication link. It will be appreciated that items like the CPU 122, the memory 124, and the cache 126, although illustrated as being disposed on the motherboard 110, may be provided instead on expansion cards. It will be appreciated that the particular embodiment illustrating FIG. 2 has been presented merely for purposes of illustration and should not be deemed to be limiting on the scope the present invention.

Although a variety of expansion cards may be utilized in connection with the computing system 100, for purposes of the present invention, only one has been illustrated. Specifically, the expansion card 140 has been illustrated herein is an ATM card 140. The ATM card 140, much like a modem, allows the computing system 100 to communicate with remote systems via telecommunications link. As is known, there are a wide variety of standards and protocols used in the telecommunications industry. ATM, which will be further described below, is just one example of a telecommunication standard. The ATM card 140, therefore, allows the computing system 100 to communicate with remote systems in accordance with the ATM standard.

Also illustrated in FIG. 2 are both a system bus 150 and a PCI bus 130. Generally speaking, the system bus 150 is a high-speed bus that interconnects the memory 124, the CPU 122, the cache 126, and other devices (not shown) that may be included within the computing system 100. Communications to and from the ATM card 140 may be communicated to the remainder of the computing system 100 via the PCI bus 130. As will be further described below, the present invention is direct to a system and method for enhancing the overall performance, operation, and efficiency of the computing system 100 when fetching data from the system memory 124 to the PCI bus 130 for communication via the ATM card 140.

However, before discussing the specifics of the present invention, some fundamental information will first be provided on cache memory devices. This information is provided merely for purposes of completeness in describing systems constructed in accordance with teachings of the present invention. It should be understood, however, the persons of ordinary skill in the art will understand and appreciate the concepts and operation of cache memory devices set forth below.

Cache Basics

As previously mentioned, a cache memory is a high-speed memory that is positioned between a microprocessor and main memory in a computer system in order to improve system performance. Cache memories (or caches) store copies of portions of main memory data that are actively being used by the central processing unit (CPU) while a program is running. Since the access time of a cache can be faster than that of main memory, the overall access time can be reduced.

Many microprocessor-based systems implement a "direct mapped" cache memory. In general, a direct mapped cache memory comprises a high-speed data Random Access Memory (RAM) and a parallel high-speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the ih line in the cache data RAM will be a copy of the $i^{th}$ line of one of the $2^m$ blocks in main memory. The identity of the main memory block that the line came from is stored in the $i^{th}$ location in the tag RAM.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "k-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Caches may also be "sector buffered" or "sub-block" type caches, in which several cache data lines, each with its own valid bit, correspond to a single cache tag RAM entry.

When the CPU executes instructions that modify the contents of the cache, these modifications must also be made in the main memory or the data in main memory will become "stale." There are two conventional techniques for keeping the contents of the main memory consistent with that of the cache—(1) the write-through method and (2) the write-back or copy-back method. In the write-through method, on a cache write hit, data is written to the main memory immediately after or while data is written into the cache. This enables the contents of the main memory always to be valid and consistent with that of the cache. In the write-back method, on a cache write hit, the system writes data into the cache and sets a "dirty bit" which indicates that a data word has been written into the cache but not into the main memory. A cache controller checks for a dirty bit before overwriting any line of data in the cache, and if set, writes the line of data out to main memory before loading the cache with new data.

A computer system can have more than one level of cache memory for a given address space. For example, in a two-level cache system, the "level one" (L1) cache is logically adjacent to the host processor. The second level (L2) cache is logically behind the first level cache, and DRAM memory (which in this case can be referred to as tertiary memory) is located logically behind the second level cache. When the host processor performs an access to an address in the memory address space, the first level cache responds if possible. If the first level cache cannot respond (for example, because of an L1 cache miss), then the second level cache responds if possible. If the second level cache also cannot respond, then the access is made to DRAM itself. The host processor does not need to know how many levels of caching are present in the system or indeed that any caching exists at all. Similarly, the first level cache does not need to know whether a second level of caching exists prior to the DRAM. Thus, to the host processing unit, the combination of both caches and DRAM is considered merely as a single main memory structure. Similarly, to the L1 cache, the combination of the L2 cache and DRAM is considered simply as a single main memory structure. In fact, a third level of caching could be included between the L2 cache and the actual DRAM, and the L2 cache would still consider the combination of L3 and DRAM as a single main memory structure.

Computer system cache memories typically cache main memory data for the CPU. If the cache uses a write-back protocol, then frequently the cache memory will contain more current data than the corresponding lines in main memory. This poses a problem for other bus masters (and for other CPUs in a multiprocessor system) desiring to access a line of main memory, because it is not known whether the main memory version is the most current version of the data. Write-back cache controllers, therefore, typically support inquire cycles (also known as snoop cycles), in which a bus master asks the cache memory to indicate whether it has a more current copy of the data.

Figure 3:
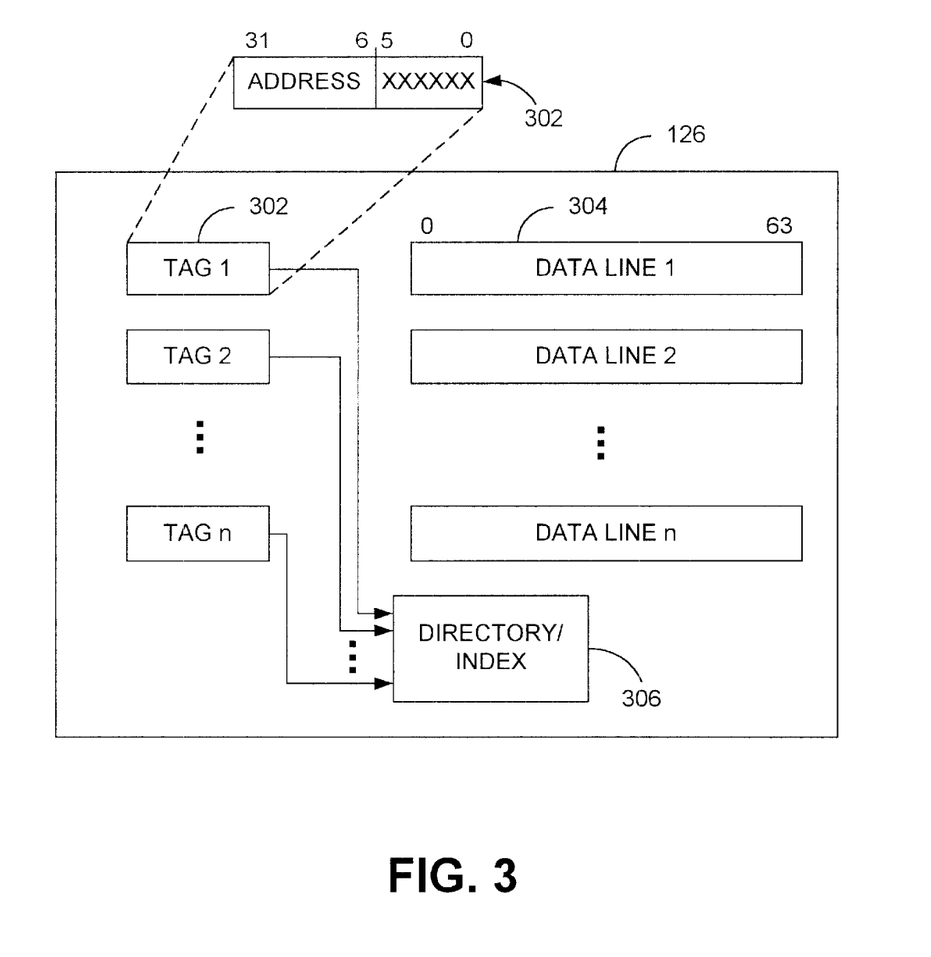
FIG. 3 is a block diagram illustrating fundamental components of a cache memory device.

FIG. 3 is a block diagram that illustrates certain fundamental components of a cache memory 126. These fundamental components include a plurality of tags 302, a corresponding plurality of data lines 304, and a directory/index 306. As is known, cache tags 302 typically comprise a portion (the most significant bits) of the address bits that define blocks (lines) of memory location(s) of target data. The least significant bits (represented as don't care values) identify the specific position (within the blocks) to a target data value in the corresponding data line 304. In accordance with the preferred embodiment of the present convention, the cache memory 126 utilizes sixty-four byte data lines 304. Therefore, the six least significant bits of the address bits specify the particular location of a target data value within a given data line 304.

Also illustrated in FIG. 3 is a directory/index 306. As is known, the directory 306 maintains a log or database of the various tags 302. Upon start-up or initialization, there is no data stored within the cache memory 126, and therefore no tags are stored in the directory 306. Therefore, when a device requests data to be read from system memory 124, and entire line 304 is read from the system memory 124 into a data line 304 of the cache memory 126. The most significant bits of the address bus are written into the corresponding tag 302, which is stored in the directory 306. Upon the next request for data from a specified memory location, the cache memory 126 will examine the directory 306 to determine whether that data value is presently within the cache. If the data value is, in fact, within the cache memory 126, then it may be accessed and read out at high speed. If, however, the data value is not presently stored within the cache memory 126, then it is retrieved from the system memory and read into an available data line 304 of the cache memory 126. As before, the most significant bits of the address bus are written into a corresponding tag, and logged in the directory 306.

The foregoing process is repeated for subsequent requests for data from system memory 124. At some point, however, all data lines 304 of the cache memory 126 will be occupied. At this point, the cache memory 126 must discard at least one line 304 of data, in order to make space available for new data to be read into the cache 126. As previously mentioned, there are a wide variety of algorithms and methods that are known for determining which lines or lines 304 of data to discard from the cache 126. Preferably, an algorithm is chosen that will discard those data lines 304 which are least likely to be used again in the near future. As data is discarded from the cache 126, the directory 306 is updated accordingly to remove the corresponding tag(s) 302 from the directory space.

Operation of the Present Invention

Having described certain basic aspects of cache memory devices, the discussion will now be directed to the preferred embodiment of present invention. In this regard, the present invention is directed to a system and method for managing the data within a cache memory 126, whereby data that is not expected to be used again in the near future is discarded from the cache 126. More specifically, the present invention is directed to a memory management system that discards data that is read through the cache memory 126 and communicated to a device in communication with the cache memory 126 via an I/O bus. This helps maximize the amount of cache memory space that is available at any given time to receive new or additional data, without having to incur the latency associated with freeing up cache memory space, if no space is available.

Figure 4:
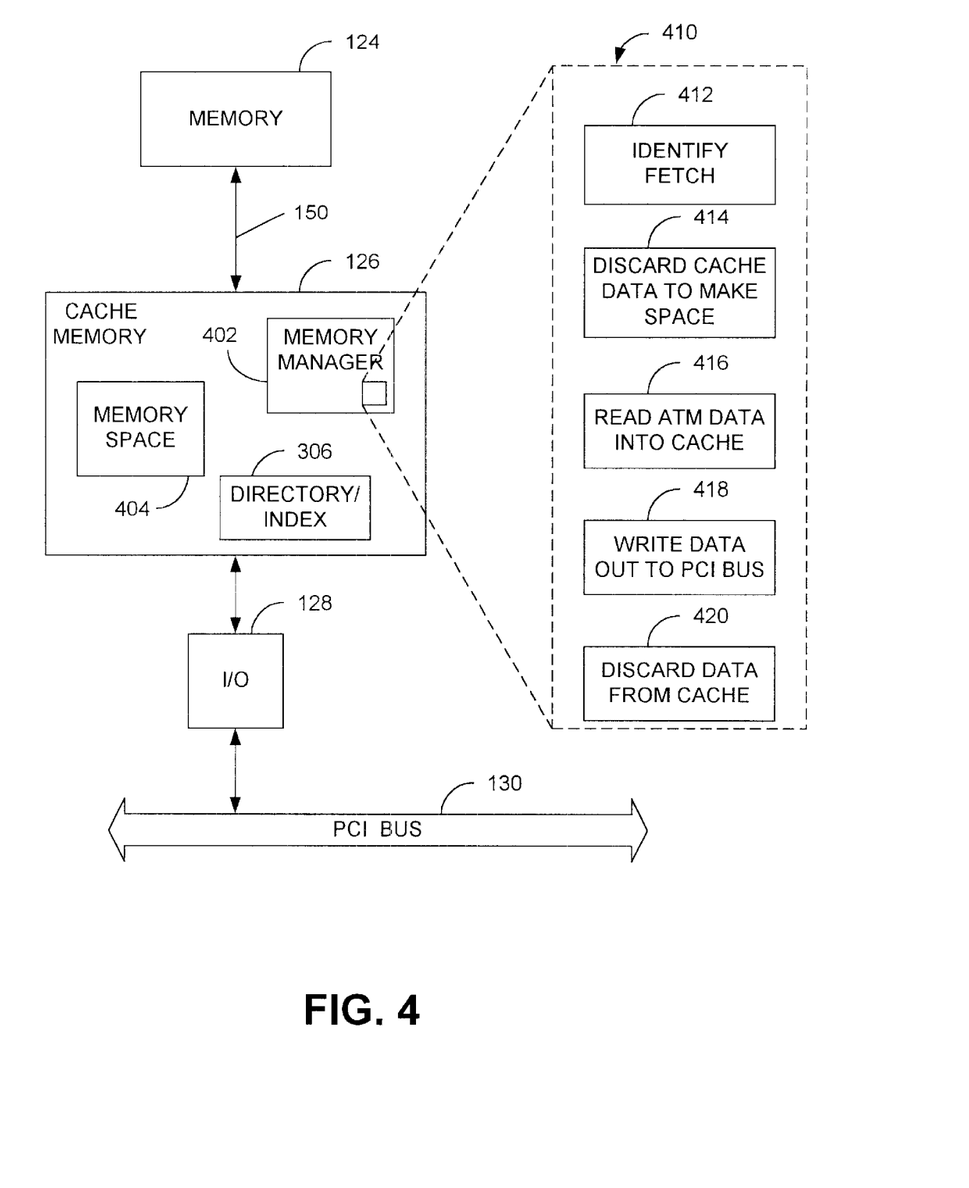
FIG. 4 is a block diagram illustrating a cache memory/memory manager constructed in accordance with the present invention.

Reference is now made to FIG. 4, which is a block diagram illustrating certain fundamental components of cache memory 126, constructed in accordance with the present invention. Principally, the cache memory 126 includes a memory manager 402, memory space 404, and a directory/index 306. The memory space 404 corresponds to the data lines 304 discussed in connection with FIG. 3. The memory manager 402 is preferably implemented in hardware, comprising integrated circuits specifically configured to carry out various functions. For example, these functions may include the identification of a transfer (or fetch) 412, discarding cache data to make space available 414, reading data into the cache 416, writing data out to the I/O bus (e.g., PCI bus) 418, and discarding data from the cache 420.

In accordance with the preferred embodiment, the present invention flushes data from the I/O cache, one line at a time. In one implementation, a given cache line of data is flushed from the cache after the last data byte of the cache line is communicated out to the requesting device. It will be appreciated, however, that more sophisticated implementations may be employed. For example, it may be determined by a cache memory controller that the requesting device has requested a block of contiguous data, which block ends at some intermediate position within the cache line. However, consistent with the inventive concepts, upon determination that the last data byte from the block has been communicated, then the invention may immediately flush the cache line containing that last data byte. If the data block spanned more than one cache line, then previous cache lines would be flushed upon communication of the last data byte from each line to the requesting device.

It will be appreciated that the present invention realizes significant performance enhancements, by recognizing that I/O traffic is usually not recurrent within a small window of time (unlike CPU instructions and certain other types of data). More particularly, significant performance gains are obtained by the invention for relatively large, contiguous data blocks, or even small data blocks, when the precise size (or ending byte) is known. For large data blocks that may consume multiple cache lines, each cache line is flushed upon communicating the last byte of the cache line out to the requesting device. Likewise, when the last byte of the requested data is known, then the cache line containing that last byte may be flushed upon communicating that byte. This makes these cache lines immediately available for receiving new data, without incurring the latency that is otherwise associated with clearing space within the cache.

The highly-efficient memory management apparatus and method of the present invention allows a relatively small I/O cache to be implemented, which can be implemented at a relatively low cost. The I/O cache of the preferred embodiment is a relatively-small, sixteen-line cache, with each line having sixty-four bytes of data.

It will be appreciated that the concepts and teachings of the present invention are generally applicable to a wide range of devices that communicate via an I/O bus, through an I/O cache, with a system bus. As one example, the concepts of the present invention may be applied to ATM communications across a PCI bus. As is know, ATM communications are generally characterized by forty-eight byte payloads. Accordingly, when a system constructed in accordance with the present invention identifies a data transfer to an ATM card, it assumes that a contiguous block of forty-eight bytes will be transmitted. If, for example, the first byte is located at the fiftieth byte of a cache line, then the forty-eight byte payload will require two cache lines (since the end of the first sixty-four byte cache line will have space for only the first fifteen data bytes). In operation, when the fifteenth data byte is read out (the sixty-fourth byte of the first cache line), then the first cache line may be flushed/discarded, immediately making it available for new data. The remaining thirty-three data bytes may then be read out to the requesting ATM card.

In accordance with one embodiment, since the last data byte of the second cache line is not read out of the cache, then the data within the second cache line may not be immediately discarded. After a period of time, however, and as other cache lines fill up, and the memory manager 402 needs space, this cache line may be deemed unlikely to be read, and may be discarded at that time. In an alternative embodiment, the system implementing the invention may recognize that the last byte of the ATM payload has been read out of the cache, and discard the second cache line at that time (correctly assuming that none of the remaining data values on that line will be needed).

The system may determine that a data request is made by an ATM card in a number of ways, consistent with the concepts and teachings of the present invention. For example, the system may know (from the system configuration) that a given card address or other identifier passed along the PCI bus, that a given card is an ATM card. Alternatively, the system may simply make this determination by monitoring (over time) the characteristics of the data transfers to and from a given card (e.g., identifying that data transfers always occur in forty eight byte blocks). Further still, the invention may employ the teachings of U.S. Pat. No. 5,745,488, which is hereby incorporated by reference. This patent alleges to teach a method for detecting packet types in a communication network. Specifically, this patent purports to disclose a system and method of evaluating packet/cell header information to detect ATM cells. Accordingly, a system and method of this type may be used to identify ATM transfers in connection with the present invention. Likewise, other methods may be used as well.

Figure 5:
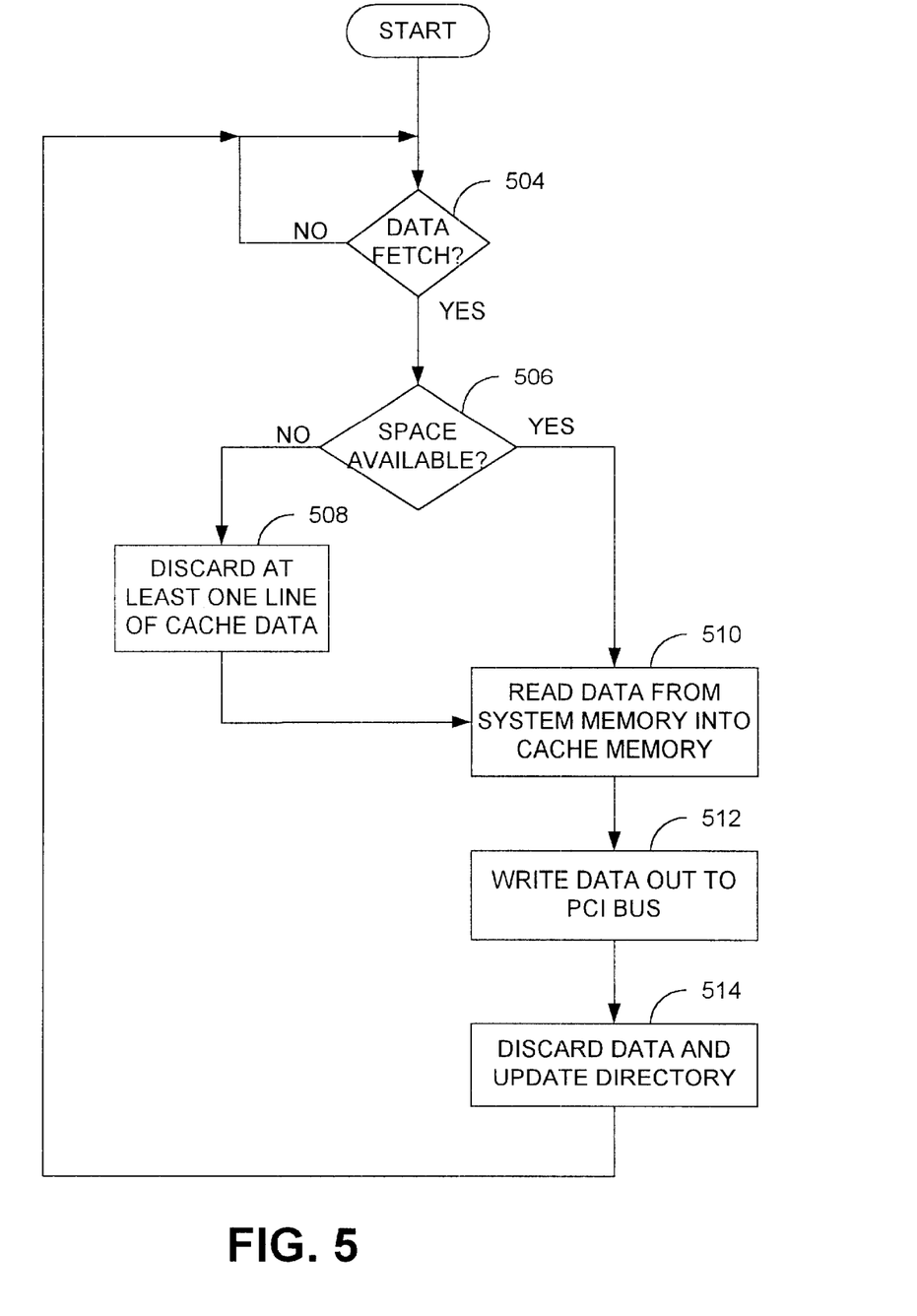
FIG. 5 is a flowchart illustrating the top-level functional operation of a system constructed in accordance with the present invention.

In accordance with one aspect of present invention, and as illustrated in FIG. 5, a method is provided for improving the performance of a cache memory manager 402. In accordance with one embodiment of the invention, the memory manager 402 (or a portion thereof) may identify incoming fetch requests to identify a request for data (step 504). Once a request is detected, the memory manager 402 may evaluates the directory 306 to determine whether memory space 404 is available to receive the data (step 506). If necessary, the manager 402 will then discard (assuming no space is available) at least one line of data (step 508).

Thereafter, the memory manager 402 controls the placement of data read from the system memory 124 into the memory space 404 of the cache memory 126 (step 510). This step implicitly may include updating the directory 306 with the tag(s) for the data line(s) read into the cache memory 126. Then, the memory manager 402 controls the communication and data out of the cache 126 to the PCI bus 130 through I/O buffer 128. Finally, the memory manager 402 discards the data by, for example, discarding the tags from the directory 306.

In accordance with one embodiment of the present invention, the memory manager 402 discards the data once the last byte in a line 304 has been output to the PCI bus 130. Since I/O data is usually sequentially ordered, then upon communicating the last line byte to the output, the memory manager can assume that no data in that line 304 will be needed again. Of course, when partial lines are communicated, such that the last byte of the line is not used for I/O data, then another mechanism may be supplied to discard those lines. Alternatively, those lines could be left within the cache memory 126, and ultimately discarded with the normal (e.g., lease recently used) discarding algorithm.

Having described preferred embodiment of the present invention above, it will be appreciated by those skilled in the art that the broad concepts of the present invention are applicable to other systems as well. In this regard, the broad objective of the present invention is to enhance system performance by immediately discarding data from a cache memory that has an extremely low probability of being read or used again in the near future. In one exemplary application of the preferred embodiment, the present invention identifies ATM data and, recognizing this data to have a low probability of near term reuse, immediately discards this data from the cache memory. In similar fashion, other types of data that may be readily identifiable as having a low probability of reuse may be, likewise, discarded from the cache memory 126. This leaves a certain amount of space within the cache readily available to receive new data, without having to first discard other data maintained within the cache memory.

Accordingly, the present invention may be properly viewed as a system having a cache memory interposed between a system memory and a device requesting data from the system memory, such that the data is fetched through the cache memory 126. The cache memory manager 402 is operable to identify "one-time" data. This "one-time" data is data having a low probability of near term reuse. In accordance with the invention, therefore, the cache memory manager 402 made discard this data immediately.

In accordance with another aspect of the present invention, the cache 126 may be configured such that tags for data lines used to temporarily hold the ATM data (or more broadly the "one-time" data) are never logged into the cache directory 306. In this way, a subsequent request for data from system memory 124 will automatically have space available within the cache memory 126, since the tags were never logged into the directory 306.

Consistent with the present invention, further optimization may be achieved. For example, in the context of an ATM data transfer, it is known that precisely forty-eight bytes of data are read from system memory 124 into the cache memory 126. Since the data will be immediately discarded from the cache memory 126, the system need not read into the cache memory, the entirety of the cache lines. By way of illustration, consider a request for ATM data, where the starting address of the data coincides with the first byte of a data line 304 in the cache memory 126. As previously described, the first forty-eight bytes of that data line will be utilized, and the last 16 bytes of that data line will not. In conventional cache memories, the full line of data is read into the cache. This is because subsequent reads to any memory location corresponding to that line (tag) of data will be directly read from the cache 126. Therefore, it is important (conventionally) that the data at the end of the cache line maintain integrity with the system memory. However, in accordance with the present invention, since the data lines containing be ATM data will immediately be discarded from the cache 126, this condition will not occur. Therefore, bandwidth on the system bus 150 may be reduced, by transferring only forty-eight bytes from the system memory 124 to the cache memory 126, instead of transferring sixty-four bytes.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a computing system having an asynchronous input/output (I/O) cache memory interposed between a system memory and a requesting device that is disposed for communication with the cache memory via an I/O bus, a method for managing data within the cache memory comprising the steps of:

identifying a request for data from the system memory by the requesting device, wherein the request is identified as being one for data that is unlikely to be requested again in the near future;

reading the data from the system memory into the cache memory;

communicating the data from the cache memory to the requesting device; and immediately discarding the data from the cache memory.

2. The method as defined in claim 1, wherein the requesting device is an ATM card.

3. The method as defined in claim 1, wherein the step of reading data reads at least 48 bytes of data from the system memory into the cache memory.

4. In a computing system having a cache memory interposed between a system memory and an input/output (I/O) bus, wherein data read from the system memory to the I/O bus is read through the cache memory, a method for managing data within the cache memory comprising the steps of:

identifying a request for data from the system memory by a device on the I/O bus;

reading the data from the system memory into the cache memory;

communicating the data from the cache memory to the I/O bus, for communication to the a requesting device; and immediately discarding the data from the cache memory.

5. The method as defined in claim 4, wherein the requesting device is an ATM card.

6. The method as defined in claim 5, wherein the step of reading the data from the system memory into the cache memory automatically reads at least 48 bytes of data into the cache memory.

7. The method as defined in claim 6, wherein the step of reading the data from the system memory into the cache memory automatically reads the appropriate number of cache lines of data into the cache memory to store the at least 48 bytes of data.

8. The method as defined in claim 5, wherein the step of reading the data from the system memory into the cache memory automatically reads precisely 48 bytes of data into the cache memory.

9. The method as defined in claim 4, further including the steps of: determining whether there is space available within the cache memory to receive the data, and discarding existing cache data to make space for the data if insufficient space is available.

10. A system for managing data in an asynchronous input/output (I/O) cache memory comprising:

memory space comprising a plurality of data lines within the cache memory;

a memory manager configured to manage the data within the memory space, the memory manager further including:

means for identifying a request for data from a device disposed to communicate with the cache memory via an I/O bus;

means for controlling the communication of data from the system memory into at least one line of the memory space;

means for controlling the communication of data from the memory space out of the cache memory to the requesting device; and means for discarding the at least one line of the memory space.

11. The system as defined in claim 10, wherein the means for discarding the at least one cache line is configured to discard the at least one cache line upon communicating a last byte of data from the at least one cache line to the requesting device.

12. The system as defined in claim 10, wherein the means for discarding the at least one cache line is configured to discard the at least one cache line upon communicating a last byte of data from a contiguous block of data, the at least one cache line being the cache line containing the last data byte in the contiguous block.

13. The system as defined in claim 10, further including a directory within the cache memory for storing a plurality of tags, wherein each tag is associated with one cache line of data.

14. The system as defined in claim 13, wherein the means for discarding data from the cache memory is configured to discard the associated tags from the directory.

15. The system as defined in claim 10, wherein the means for communicating data from the system memory into the memory space is configured to communicate full lines of data at a time.

16. The system as defined in claim 10, wherein the means for communicating data from the system memory into the memory space is configured to communicate precisely 48 bytes of data.

17. The system as defined in claim 10, wherein the various means elements of the memory manager are implemented in hardware.

* * * * *